US009033596B2

(12) United States Patent
Samuels

(10) Patent No.: US 9,033,596 B2
(45) Date of Patent: May 19, 2015

(54) CAMERA MOUNT VIBRATION DAMPENER

(71) Applicant: Rudy Lucas Samuels, Mill Valley, CA (US)

(72) Inventor: Rudy Lucas Samuels, Mill Valley, CA (US)

(73) Assignee: GoPro, Inc., San Mateo, CA (US)

( * ) Notice: Subject to any disclaimer, the term of this patent is extended or adjusted under 35 U.S.C. 154(b) by 62 days.

(21) Appl. No.: 13/652,370

(22) Filed: Oct. 15, 2012

(65) Prior Publication Data

US 2014/0105589 A1    Apr. 17, 2014

(51) Int. Cl.
*G03B 17/00* (2006.01)
*F16F 7/00* (2006.01)
*G03B 17/08* (2006.01)
*G03B 17/56* (2006.01)

(52) U.S. Cl.
CPC . *F16F 7/00* (2013.01); *G03B 17/08* (2013.01); *G03B 17/561* (2013.01); *G03B 17/566* (2013.01)

(58) Field of Classification Search
CPC ............... H04N 5/23248; H04N 2201/02491; H04N 5/225; H04N 88/02; G03B 17/56; F16M 11/04; F16M 13/04; H04B 1/385; H04M 1/04
USPC ................. 396/421, 428, 25; 455/557, 575.1; 348/373
See application file for complete search history.

(56) References Cited

U.S. PATENT DOCUMENTS

| | | | | |
|---|---|---|---|---|
| 5,842,069 | A | * | 11/1998 | Konno .......................... 396/419 |
| 5,887,375 | A | * | 3/1999 | Watson .......................... 42/106 |
| 6,315,180 | B1 | | 11/2001 | Watkins |
| 6,654,235 | B2 | | 11/2003 | Imsand |
| 8,014,656 | B2 | | 9/2011 | Woodman |
| 8,199,251 | B2 | | 6/2012 | Woodman |
| 8,325,270 | B2 | | 12/2012 | Woodman |
| 2014/0027591 | A1 | * | 1/2014 | Fountain .................. 248/226.11 |

FOREIGN PATENT DOCUMENTS

EP        0845399 A2    6/1998

OTHER PUBLICATIONS

PCT International Search Report for Written Opinion for PCT/US2013/062061, Mar. 3, 2014, 15 pages.

* cited by examiner

*Primary Examiner* — Rochelle-Ann J Blackman
(74) *Attorney, Agent, or Firm* — Fenwick & West LLP

(57) ABSTRACT

A vibration dampener for a camera mount is structured to reduce the movement of a first mount component relative to a second mount component. An upper camera mount component securing a camera couples to a lower camera mount component, which in turn couples to a base mount component configured to couple to a user, a sports board, a helmet, a vehicle, and the like. The vibration dampener is compressibly inserted between the lower mount component and the base mount component, causing the vibration dampener to exert an outward force on the lower mount component, and securing the lower mount component against a portion of the base mount component. The movement of the lower mount component relative to the base mount component is accordingly reduced by the vibration dampener.

6 Claims, 11 Drawing Sheets

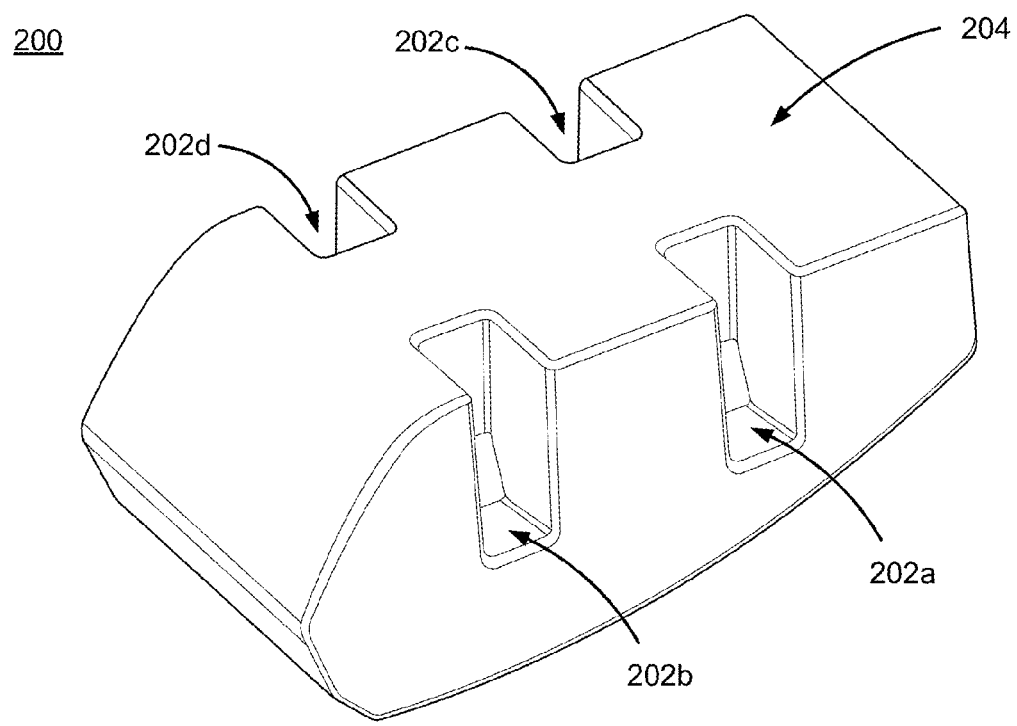
FIG. 6a
FIG. 6b
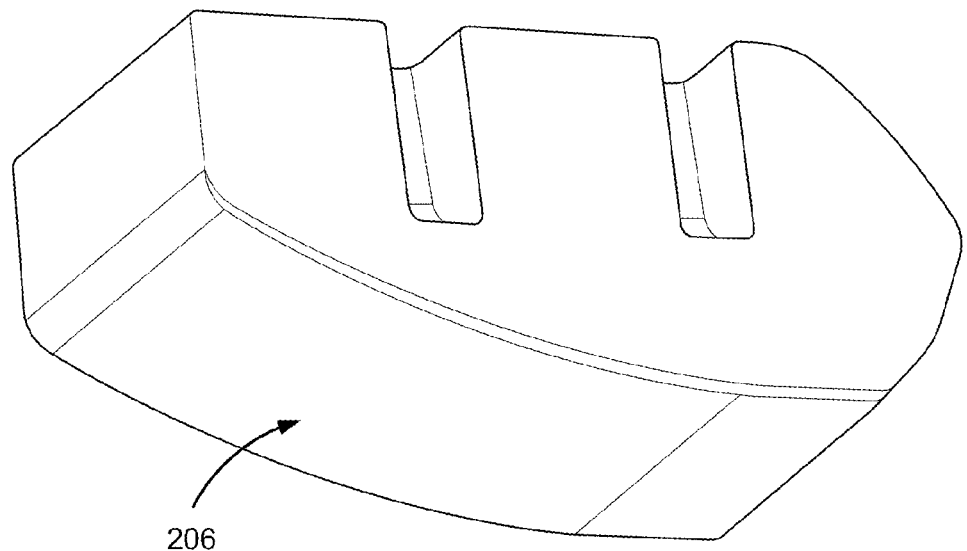

CAMERA MOUNT VIBRATION DAMPENER

BACKGROUND

1. Technical Field

This disclosure relates to camera mounts, and more specifically to a vibration dampening component for use in conjunction with a camera mount.

2. Description of the Related Arts

Many users place their portable devices in housings, either to mount the device on a larger object, to allow for the underwater operation of the device, or merely to protect the device from accidental damage. In particular, some portable cameras come with housings that may be placed on a mount coupled to a user or a piece of sporting equipment to allow a user to capture photographs or video while keeping one or both hands free. These housings and mounts are especially useful while the user is performing fast-paced physical activities, such as surfing, bicycling, kayaking, or skydiving.

Each camera mounts can include a variety of mount components coupled together to form a singular mount. The exact size and shape of each camera mount component can vary due to dimensional tolerances and process variation when manufacturing the mount components. As a result, the dimensional variance of each mount component can cause some mounts components to fit together less snugly than others, and can result in unintended minor gaps ("variation gaps") between coupled mount components.

Using a camera and camera mount in the fast-paced physical activities discussed above often cause the camera housing and mount to experience rapid changes in movement, direction, and speed. For coupled mount components with variation gaps, such rapid changes in movement, direction, and speed can additionally cause the movement of a mount component coupled to the camera relative to another mount component (referred to herein as "camera vibration"). As a result, in addition to experiencing the same rapid changes in movement, direction, and speed, the camera mount can experience shaking or other rapid movement as a result of camera vibration. Camera operation in such circumstances can result in the capture of shaky, blurred, or unfocused images and video.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIGS. 6a and 6b illustrate a vibration dampening component for use in a camera mount system, according to one embodiment.

DETAILED DESCRIPTION

The figures and the following description relate to preferred embodiments by way of illustration only. It should be noted that from the following discussion, alternative embodiments of the structures disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system for purposes of illustration only. One skilled in the art will readily recognize from the following description that alternative embodiments of the structures illustrated herein may be employed without departing from the principles described herein.

Overview

A camera system includes a camera, a housing that is structured to enclose the camera, a camera mount, and a vibration dampening component. The camera mount includes a plurality of mount components, and the vibration dampening component is configured to reduce camera vibration (the unintended movement of one mount component relative to another as a result of variation gaps). The vibration dampening component exerts an outward force on mount components, absorbing all or part of the forces exerted by the mount components during camera vibration, reducing the movement of one mount component relative to another.

The camera mount can include a lower mount component and a base mount component. The lower mount component couples to the base mount component, and the base mount component couples to a capture surface. The capture surface is a location selected by a user of the camera system to which the camera mount is coupled, such as a sports board, a helmet, a chest mount, a vehicle, and the like. The vibration dampening component can reduce movement of the lower mount component relative to the base mount component when the lower mount component is coupled to the base mount component.

The camera mount can additionally include an upper mount component structured to enclose a camera, and a turnable hand screw configured to couple the upper mount component to the lower mount component such that the upper mount component can rotate around the handscrew relative to the lower mount component when the handscrew is in a first position and such that the upper mount component can be locked into a fixed position relative to the lower mount component when the handscrew is in a second position.

System Configuration

Figure 1:
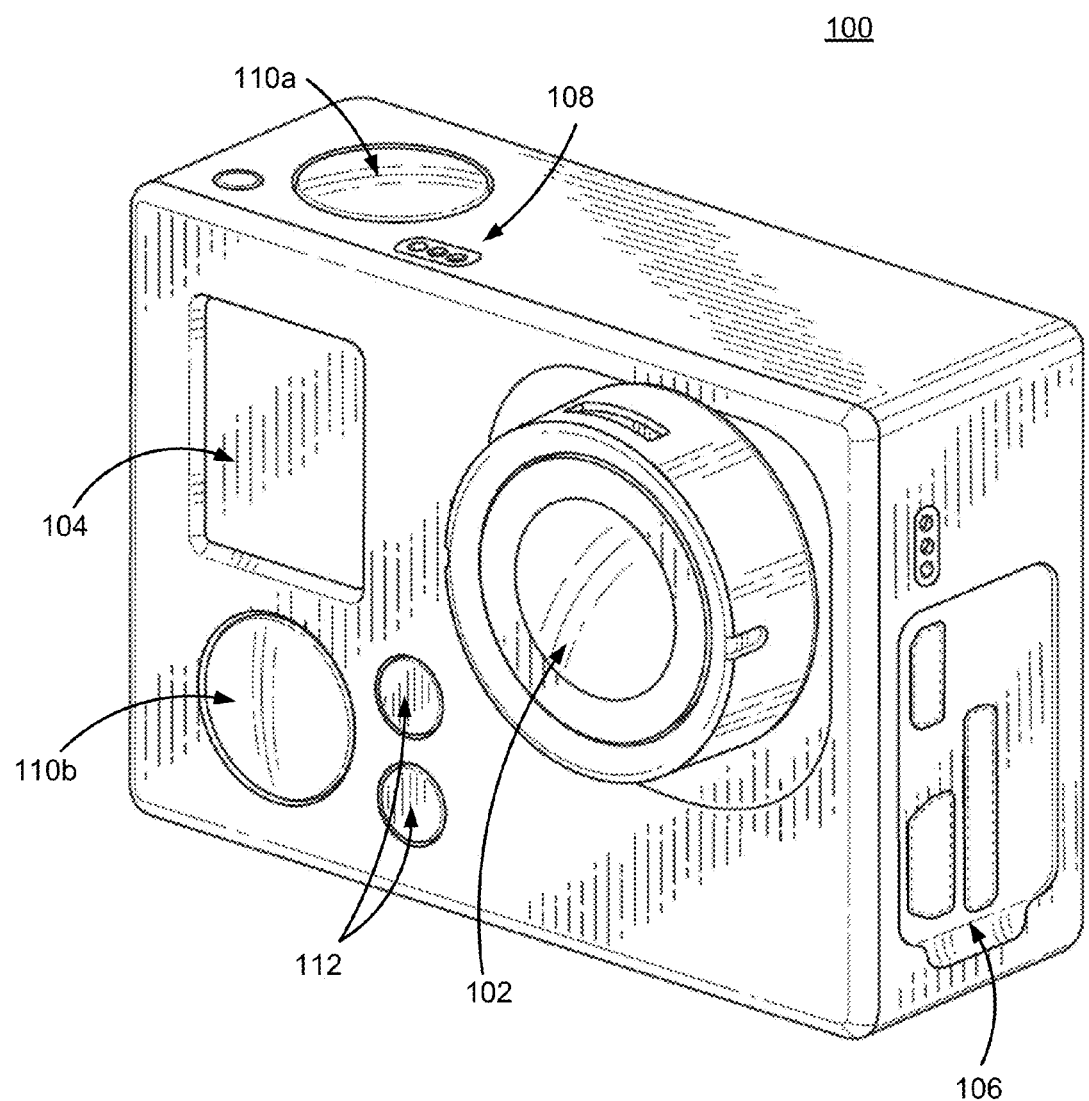
FIG. 1 illustrates a camera, according to one embodiment.

A camera system includes a camera, a camera housing, a camera mount, and a vibration dampener. FIG. 1 illustrates a camera, according to one embodiment. The camera 100 can be configured to operate as a still image camera, a moving image camera, or both, and may include any number of various operating modes. The camera of the embodiment of FIG. 1 includes a lens 102, a display 104, a communication interface 106, a microphone 108, interface buttons 110a and 110b, and indicator lights 112. The back portion of the camera 100 can include an LCD display, a viewfinder, a battery interface, an expansion module interface, a wireless interface, and various other communication interfaces, interface buttons, indicator lights, a memory interface, and the like. In other embodiments, the camera can include different, additional, or fewer features than the camera described in the embodiments of FIG. 1 and elsewhere herein.

The camera lens 102 is located on the front exterior surface of the camera 100, and focuses light onto a sensor inside the camera configured to capture light incident upon the sensor. The camera converts captured light into an image or a series of sequential images (e.g. video), and the image or video is stored in memory for subsequent retrieval, display, and/or communication. Internally, the camera includes imaging electronics (including for instance, the sensor, one or more color filter arrays, and one or more processors) configured to perform one or more image processing operations on the captured light to produce image- and video-format data. Camera memory is any non-transitory computer-readable storage medium, such as an internal hard drive, flash drive, random-access memory, and the like; a removable memory, such as a flash memory card inserted into a memory interface; or external memory, such as a hard drive, computer, or data center communicatively coupled to the camera and located externally to the camera. The camera memory can stored images and video captured by the camera, and can include computer program instructions that when executed by a camera processor cause the camera to perform one or more camera functions as described herein.

Figure 2A:
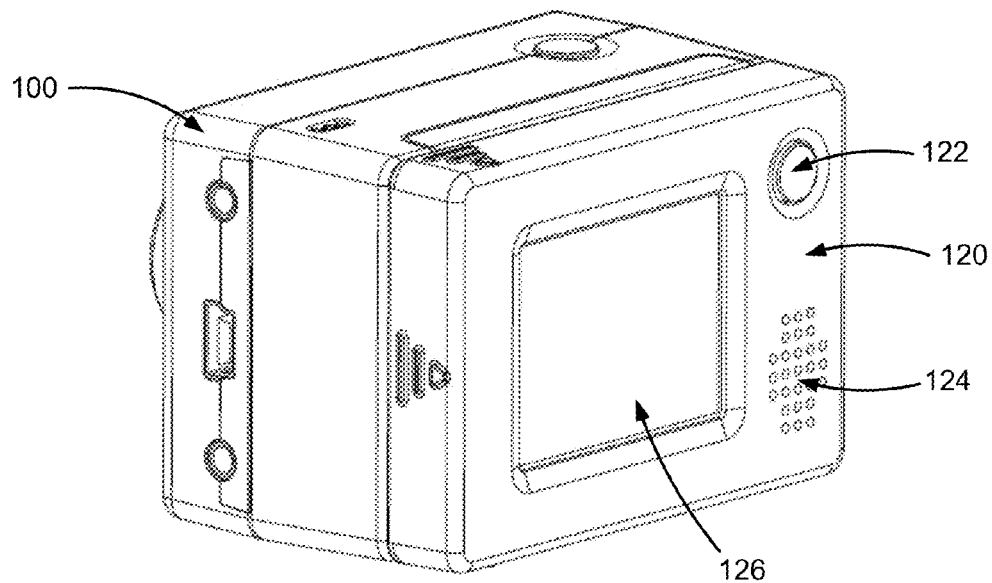
FIGS. 2a and 2b illustrate a camera with a detachable camera expansion module, according to one embodiment.
Figure 2B:
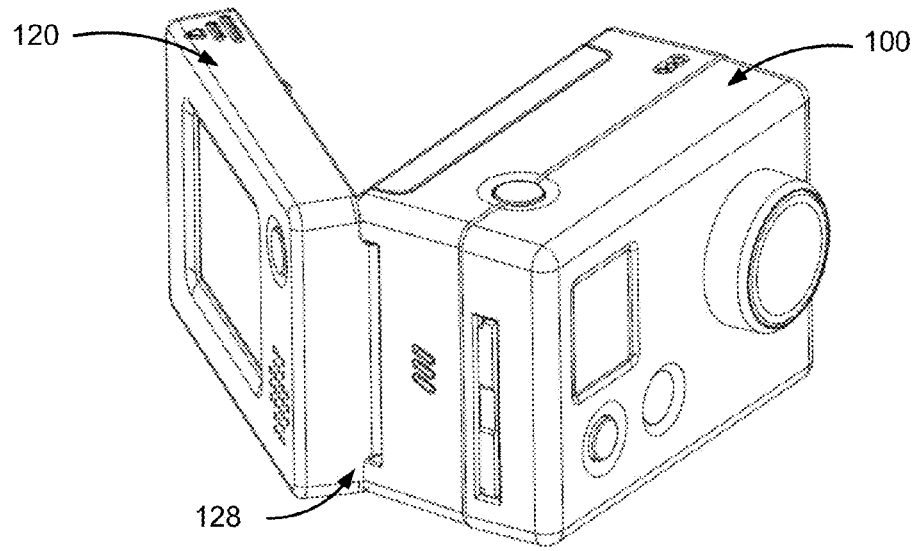

FIGS. 2a and 2b illustrate a camera with a detachable camera expansion module, according to one embodiment. In FIGS. 2a and 2b, a detachable camera expansion module 120 couples to a camera 100. The expansion module of FIGS. 2a and 2b includes an interface button 122, a speaker 124, and a display 126. The expansion module of FIGS. 2a and 2b couples to the camera at a first coupling interface 128. The first coupling interface 128 can be a mechanical hinge structure configured to allow the expansion module to rotate around the hinge structure relative to the camera. In addition, the expansion module can couple to the camera at a second coupling interface (not shown in the embodiments of FIGS. 2a and 2b). The second coupling interface can be a communicative interface that allows the expansion module to communicate with the camera. In addition, the first coupling interface and the second coupling interface allow the expansion module to fixedly couple to the camera. The expansion module is described in greater detail in U.S. patent application Ser. No. 13/469,926, filed May 11, 2012, and U.S. patent application Ser. No. 12/498,890, filed Jul. 7, 2009, the contents of which are hereby incorporated in their entirety.

Figure 3:
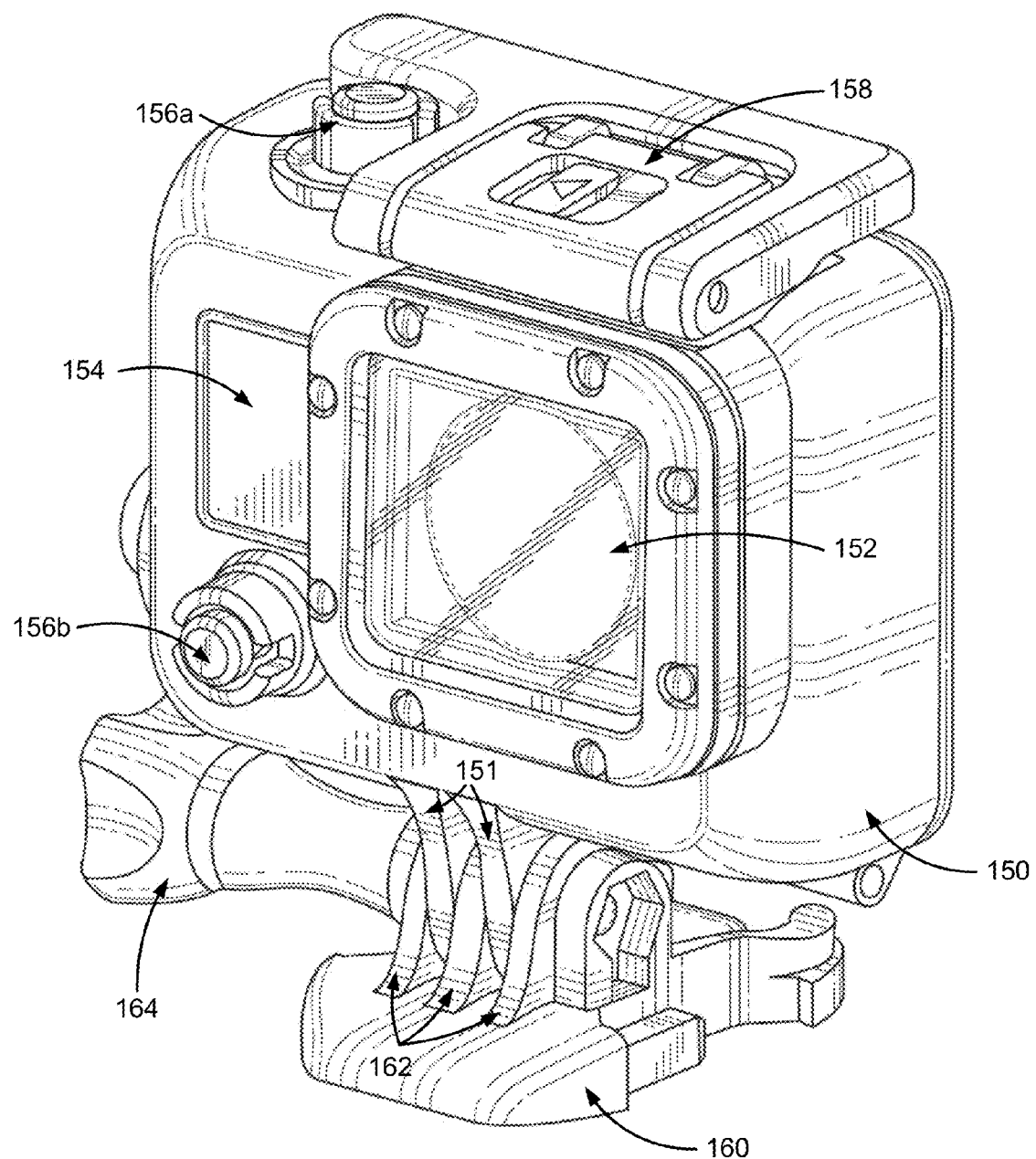
FIG. 3 illustrates a camera housing coupled to lower mount component, according to one embodiment.

FIG. 3 illustrates a camera housing coupled to lower mount component, according to one embodiment. The camera housing 150, also referred to herein as the upper mount component, is configured to enclose a camera. The camera housing can be rigid (or substantially rigid) (e.g., plastic, metal, fiberglass, etc.) or pliable (or substantially pliable) (e.g., leather, vinyl, neoprene, etc.). The camera housing of FIG. 3 includes a front face and four sides (i.e. a top side, bottom side, left side, and right side) structured to form a cavity that receives a camera. The camera housing also includes a housing door (not shown in FIG. 3) that detachably couples to the four sides opposite the front face to form a back face of the camera housing, thereby enclosing a camera inserted into the housing cavity when the door is coupled to the four sides and is in a closed position. In one embodiment, when the housing door is in a closed position, the housing creates a waterproof seal around the camera enclosed within the housing.

The camera housing 150 includes a lens 152. In one embodiment, when the camera 100 of FIG. 1 is enclosed within the camera housing of FIG. 3, the lens 102 of the camera aligns with the lens 152 of the housing. The camera housing also includes a lens 154 and buttons 156a and 156b that can align with the display 104 and buttons 110a and 110b, respectively, when the camera of FIG. 1 is enclosed within the camera housing of FIG. 3. The camera housing also includes a first fastening structure 158 configured to securely couple to a housing door, as explained in greater detail in FIG. 4 below.

The camera housing 150 includes two protrusions 151 on the bottom surface of the camera housing, and the lower mount component 160 includes three protrusions 162 on the top surface of the lower mount component. In one embodiment, each of the two protrusions 151 and the three protrusions 162 include a hole of similar diameter such that when the two protrusions 151 of the camera housing are inserted into the spaces between the three protrusions 162, the holes can substantially align. When the holes are substantially aligned, the handscrew 164 can be inserted through the holes, thereby coupling the camera housing to the lower mount component. The housing can pivot around the lower mount component when the handscrew is in a first position, and can be fixedly coupled to the lower mount component when the handscrew is in a second position. It should be noted that a pin or any other mechanism configured for coupling the camera housing and the lower mount can be used in place of a turnable handscrew.

It should be noted that in other embodiments, upper mount components other than the camera housing of FIG. 3 can be used to secure a camera. In one embodiment, an upper mount component is configured to securely couple to a camera without necessarily enclosing the camera. In these embodiments, the upper mount component may enclose only a portion of the camera, leaving other portions of the camera exposed. For example, an upper mount component may secure around the bottom, top, and side surfaces of a camera, exposing the front and the back surface of the camera. In other embodiments, an upper mount component may couple to only a bottom surface of the camera, for instance using an adhesive, a releasable latch, Velcro, or any other securing mechanism.

Figure 4:
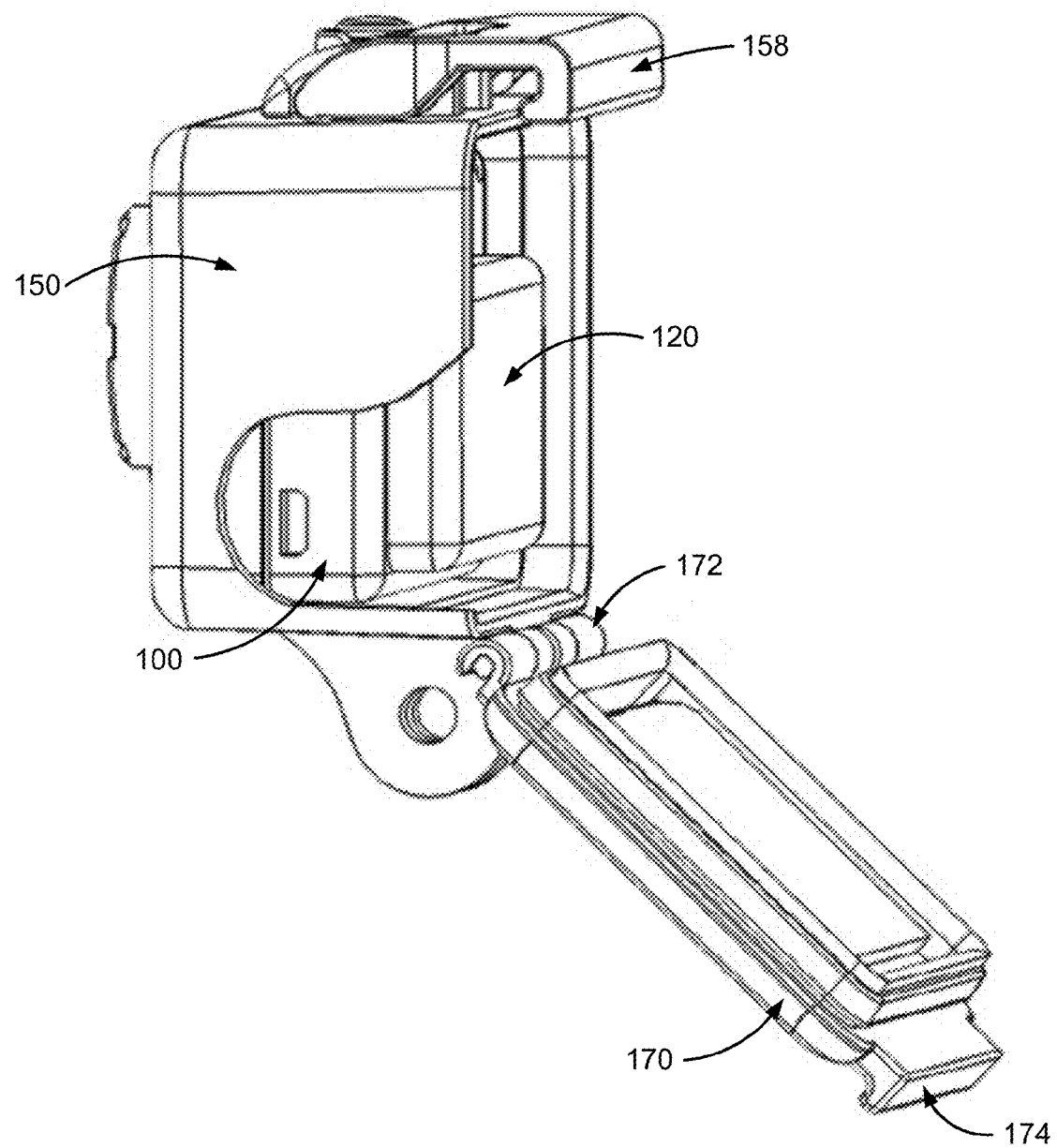
FIG. 4 illustrates a cutaway view of a camera inserted into a camera housing with an open housing door, according to one embodiment.

FIG. 4 illustrates a cutaway view of a camera inserted into a camera housing with an open housing door, according to one embodiment. The housing 150 is configured to enclose a camera 100 coupled to an expansion module 120. A housing door 170 detachably couples to the housing via a hinge 130 that allows the door to pivot around the hinge. When the door is opened, the camera 100 and expansion module 120 can be inserted and removed from the housing. The door includes a second fastening structure 174 that can detachably couple to the first housing structure 158 when the door is in a closed position. In the embodiments of FIGS. 3 and 4, the first fastening structure can pivot upwards to allow the door to close, and then can be pressed downwards around the second fastening structure 174 to hold the door in a closed position. In other embodiments, fastening structures for securing the door can include, for example, a button assembly, a buckle assembly, a clip assembly, a hook and loop assembly, a magnet assembly, a ball and catch assembly, and an adhesive assembly, or any other type of securing mechanism.

Figure 5A:
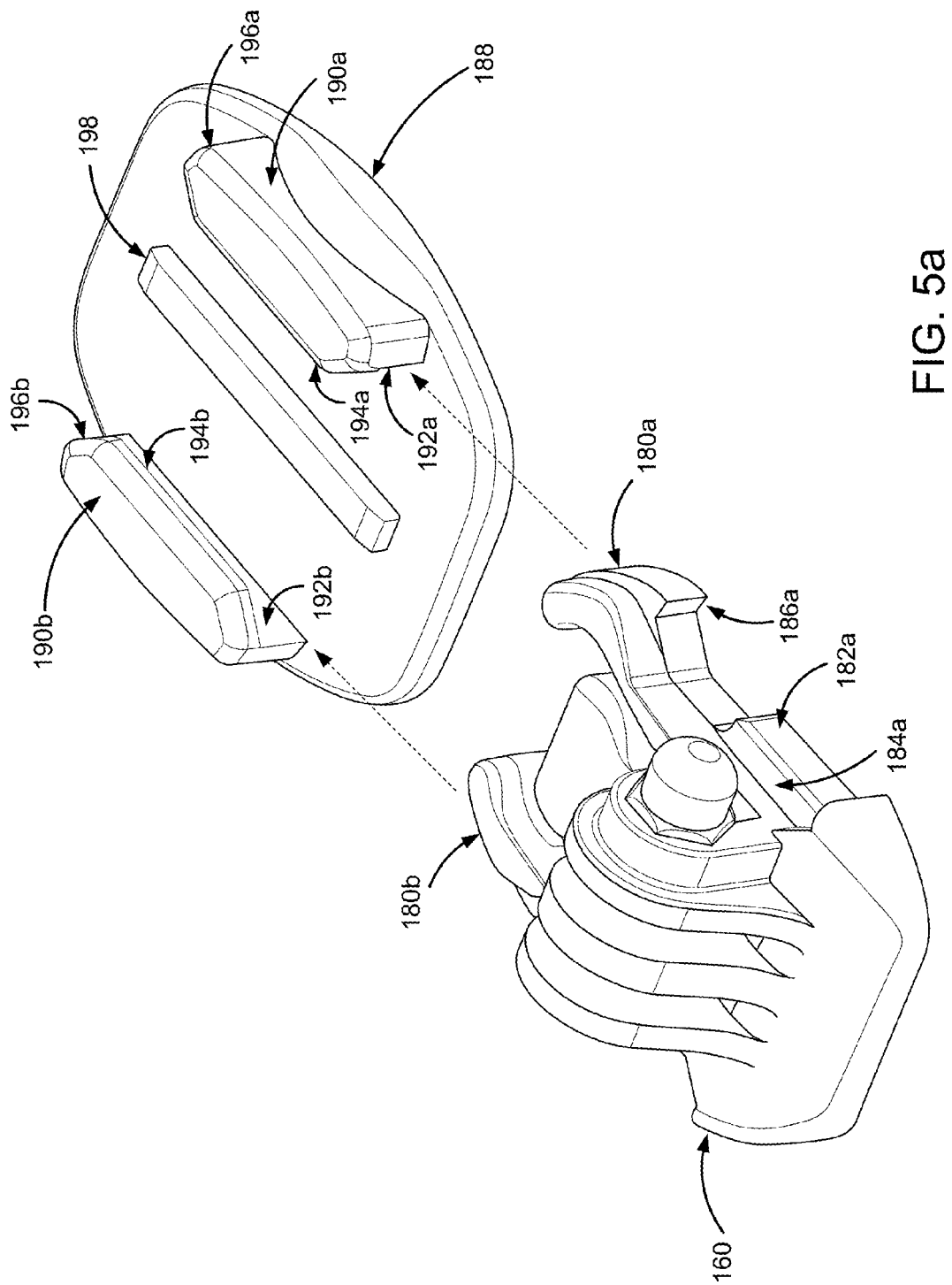
FIG. 5a illustrates a lower mount component uncoupled to a base mount component, according to one embodiment.

FIG. 5a illustrates a lower mount component uncoupled from a base mount component, according to one embodiment. The lower mount component 160 includes two prongs 180a and 180b that can be flexibly compressed inward when squeezed. The prongs 180a and 180b include side securing surfaces 182a and 182b (not shown), top securing surfaces 184a and 184b, and securing lips 186a and 186b (not shown), respectively. The base mount component 188 includes securing arms 190a and 190b, each with side securing surfaces 192a and 192b, top securing surfaces 194a and 194b, and back securing surfaces 196a and 196b, respectively. The base mount component additionally includes spine 198.

Figure 5B:
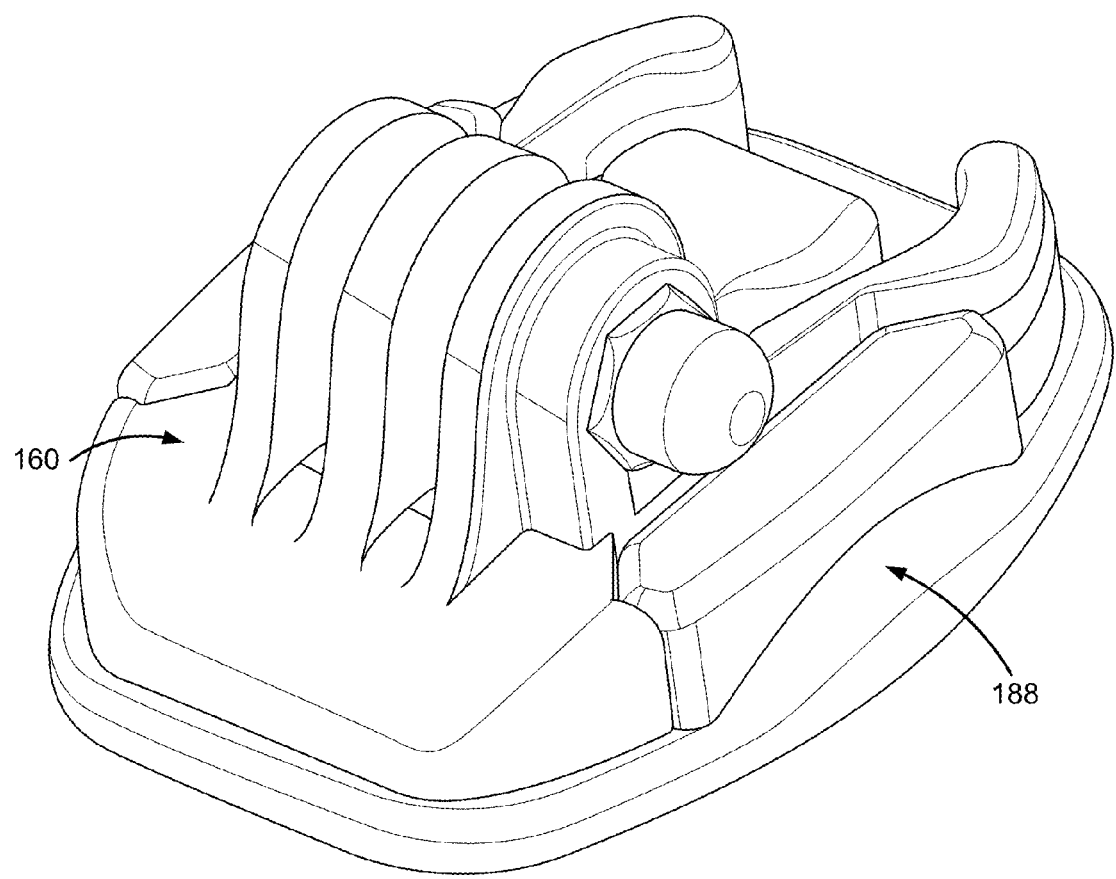
FIG. 5b illustrates a lower mount component coupled to a base mount component, according to one embodiment.

When the prongs 180a and 180b of the lower mount component 160 are squeezed together, the width of the prong-side of the lower mount component is reduced to less than the width between the securing arms 190a and 190b, such that the lower mount component can be slid onto the base mount component 188. When the lower mount component is slid onto the base mount component 188, the side securing surfaces 182a and 182b make contact with and slide along the side securing surfaces 192a and 192b, respectively. Similarly, the top securing surfaces 184a and 184b make contact with and slide along the top securing surfaces 194a and 194b, respectively. When the lower mount component is completely slid into the base mount component 188, the securing arms decompress outward when the securing lips 186a and 186b are slid past the back securing surfaces 196a and 196b. The securing arms flexibly exert force outward such that the securing lips extend outwards and make contact with the back securing surfaces or overlap at least partially with the back securing surfaces, preventing the lower mount component from sliding backwards and securely coupling the lower mount component to the base mount component as illustrated in FIG. 5b. The lower mount component can be uncoupled from the base mount component by compressing the securing arms of the lower mount component such that the width of the prong-side of the lower mount component is again reduced to less than the width between the securing arms of the base mount component, and sliding the lower mount component backwards past the base mount component.

The lower mount component 160 can include a spine groove on the bottom side of the lower mount component to allow for the reciprocal sliding and insertion of the spine 198 of the base mount component 188 into the spine groove when the lower mount component is slid onto and secured to the base mount component. A vibration dampener component can be inserted or attached the bottom side of the lower mount component such that the spine of the base mount component compresses the vibration dampener component upwards into the bottom side of the lower mount component. The upward force exerted by the spine onto the compressibly inserted vibration dampener component results in an upward force exerted by the vibration dampener component into the bottom side of the lower mount component. The upward force exerted by the vibration dampener component into the lower mount component forces the lower mount component upward such that the top securing surfaces 184a and 184b are forced upward into the top securing surfaces 194a and 194b.

The upward force of the lower mount component 160 into the top securing surfaces 194a and 194b of the securing arms 190a and 190b result in the vertical securement of the lower mount component onto the base mount component. In other words, by forcing the lower mount component upwards, the vibration dampening component prevents any up or down motion by the lower mount component relative to the base mount component. In addition, the upwards force exerted by the vibration dampening component into the lower mount component (the force exerted by the top securing surfaces 182a and 182b into the top securing surfaces 192a and 192b, respectively), in combination with the coefficient of friction between both the top securing surfaces 182a and 192a and the top securing surfaces 182b and 192b, results in a friction force between the lower mount component and the base mount component. The friction force prevents any horizontal movement of the lower mount component relative to the base mount component resulting from horizontal forces on the lower mount component less than the friction force. Thus, the vibration dampening component secures the lower mount component onto the base mount component by preventing both the vertical and the horizontal movement of the lower mount component relative to the base mount component.

It should be noted in alternative embodiments, the lower mount component 160 is configured to securely couple to the base mount component 188 using other means than those described with regards to FIGS. 5a and 5b. For example, the lower mount component can include a securing protrusion on the bottom side of the lower mount component configured for insertion into a reciprocal opening within the base mount component, and secured using, for example, a securing pin or other locking mechanism. Similarly, the securing arms 190a and 190b of the base mount component can be compressible or flexible such that the arms can be squeezed apart, the lower mount component can be slid onto the base mount component, and the arms can be released, securely coupling the lower mount component to the base mount component. The lower mount component can be securely coupled to the base mount component using adhesives, buttons, ties, latches, springs, or any combination of the mechanisms described herein. Any other suitable securing mechanism can be used to secure the lower mount component to the base mount component.

FIGS. 6a and 6b illustrate a vibration dampening component for use in a camera mount system, according to one embodiment. In the embodiments of FIGS. 6a and 6b, the vibration dampening component 200 includes four securing channels: 202a, 202b, 202c, and 202d. In addition, the vibration dampening component includes a top surface 204, and a bottom surface 206, which may be sloped. The vibration dampening component also includes a left surface and a right surface. The vibration dampening component can be composed of any compressible or elastic material or combination of materials, such as rubber, plastic, foam, and the like.

Figure 7A:
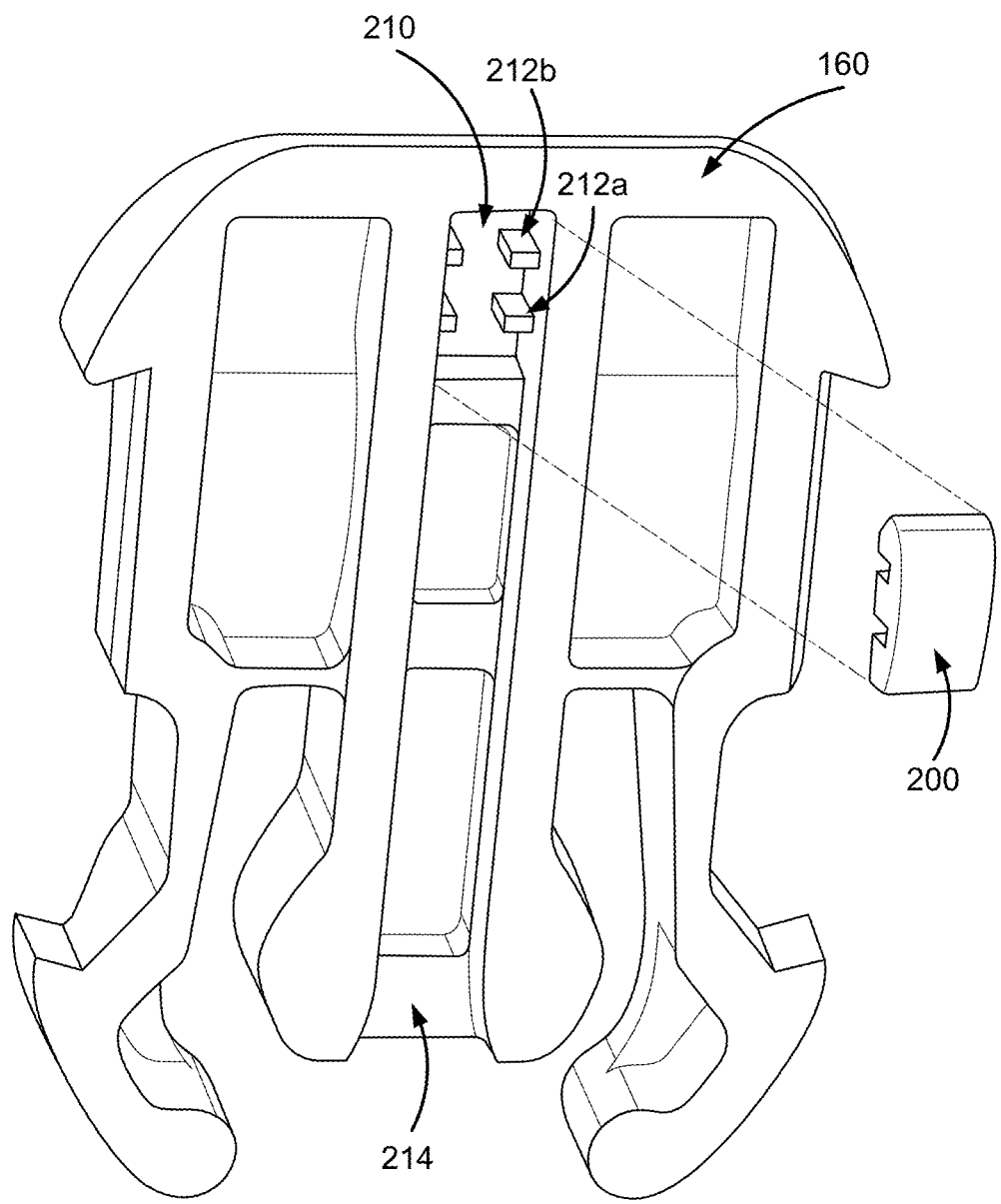
FIGS. 7a and 7b illustrate a cavity within a lower mount component structured for the insertion of a vibration dampening component, according to one embodiment.
Figure 7B:
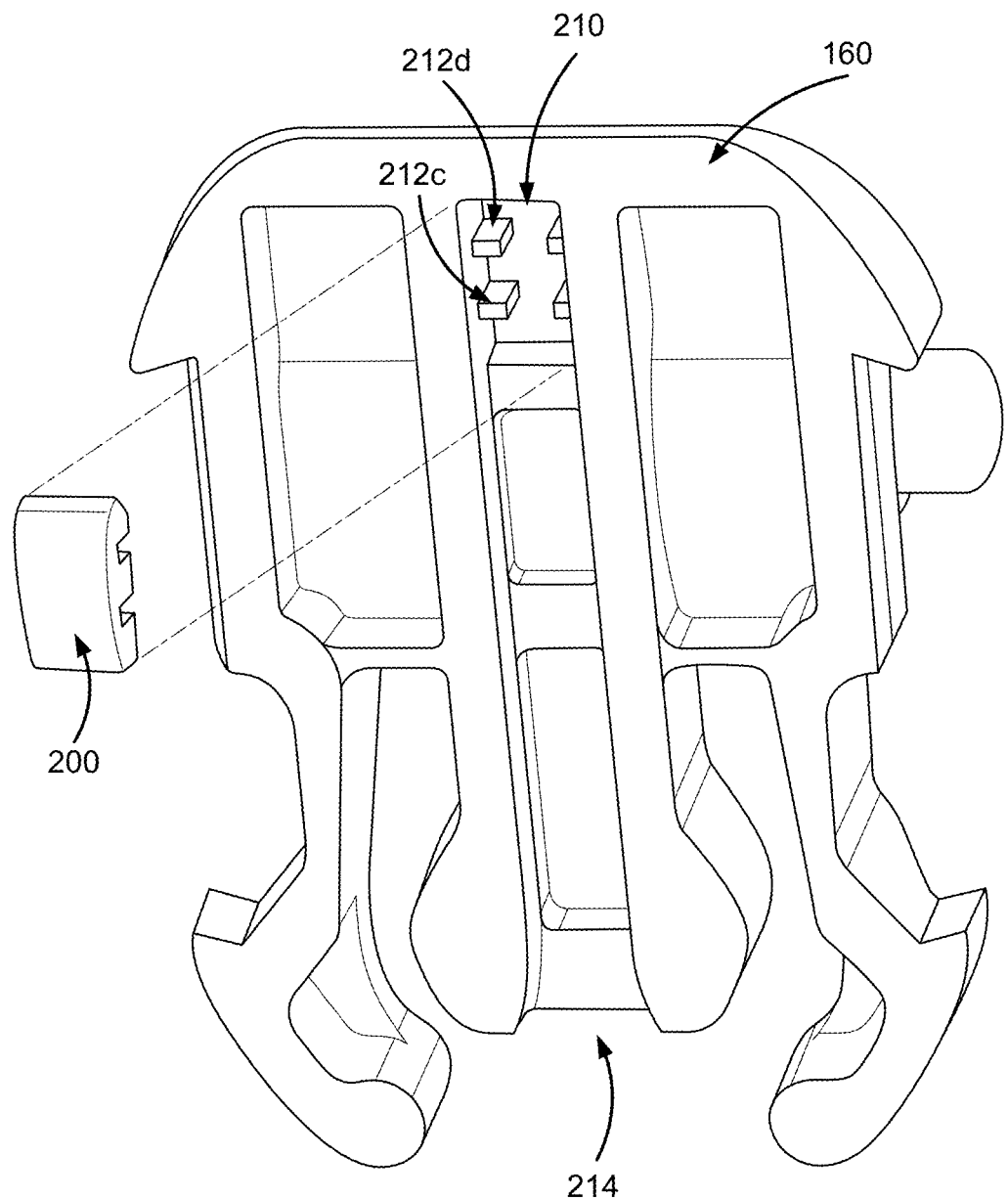

FIGS. 7a and 7b illustrate a cavity within a lower mount component structured for the insertion of a vibration dampening component, according to one embodiment. The lower mount component 160 of FIGS. 7a and 7b is configured for the insertion of the dampening component 200. The lower mount component includes a reciprocal cavity 210 into which the dampening component is inserted. The reciprocal cavity is shaped such that the dampening component fits snugly into the reciprocal cavity. In one embodiment, the dimensions of the reciprocal cavity (the width, length, and depth) are substantially similar to the dimensions of the dampening component (the width, length, and height).

In the embodiments of FIGS. 7a and 7b, the reciprocal cavity 210 includes four securing protrusions: 212a, 212b, 212c, and 212d. The securing protrusions are shaped and arranged such that when the dampening component 200 is inserted into the reciprocal cavity, the securing protrusions 212a, 212b, 212c, and 212d are inserted into the four securing channels 202a, 202b, 202c, and 202d, respectively. The dimensions of the securing protrusions can be substantially similar to the dimensions of the securing channels. In such an embodiment, when the dampening component is inserted into the reciprocal cavity snugly, the securing protrusions substantially fill the securing channels while the top surface 204 of the dampening component makes flush contact with the top surface of the reciprocal cavity (e.g., a substantial portion of the surface area of the top surface of the dampening component makes contact with a substantial portion of the surface area of the top surface of the reciprocal cavity). The securing protrusions and securing channels secure the dampening component into place within the reciprocal cavity, preventing movement of the dampening coefficient within the reciprocal cavity.

The lower mount component 160 of the embodiments of FIGS. 7a and 7b include a spine groove 214 shaped and arranged for the insertion of the spine 198 of the base mount component 188 into the spine groove when the lower mount component is slid onto the base mount component. The dimensions of the spine groove can be substantially similar to the dimensions of the spine. For instance, the length, width, and depth of the spine groove can be substantially similar to the length, width, and height of the spine. In such embodiments, the spine can fit snugly within the spine groove (such that the top surface and side surfaces of the spine make flush contact with the top surface and the side surfaces of the spine groove, respectively) when the lower mount component is slid onto and secured upon the base mount component.

Figure 8:
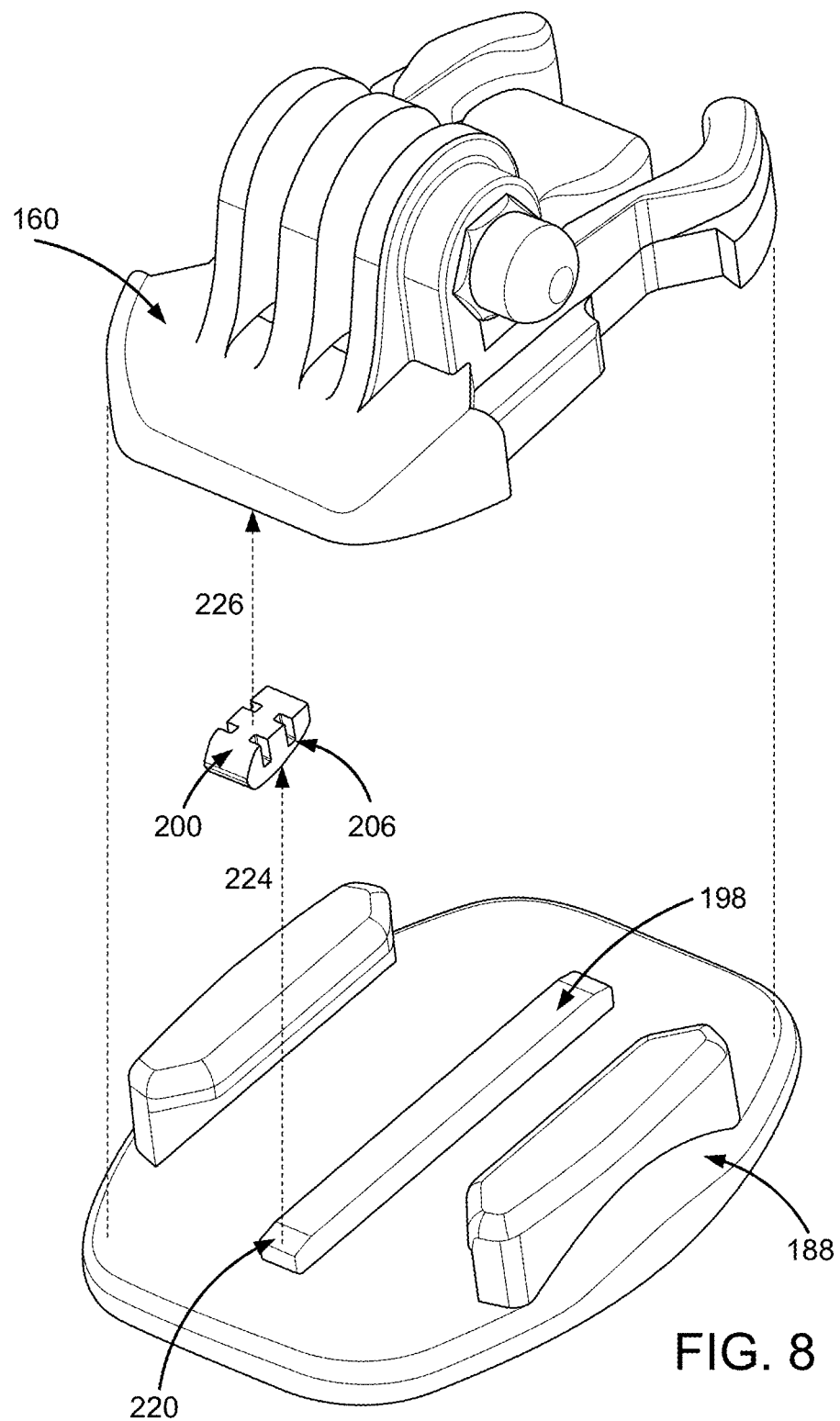
FIG. 8 illustrates an exploded view of a lower mount component, a base mount component, and a vibration dampening component, according to one embodiment.

FIG. 8 illustrates an exploded view of a lower mount component, a base mount component, and a vibration dampening component, according to one embodiment. In the embodiment of FIG. 8, the vibration dampening component 200 is inserted into a reciprocal cavity 210 of the lower mount component 160, and the lower mount component is subsequently slid onto and secured upon the base mount component 188. The spine 198 of the base mount component includes a sloped surface 220. When the lower mount component with the vibration dampening component is secured on to the base mount component, the bottom surface 206 of the vibration dampening component is forcibly pressed against the sloped surface of the spine, compressing the vibration dampening component as a result of the upward force 224 exerted upon the vibration dampening component by the sloped surface of the spine. In turn, the vibration dampening component exerts an upward force 226 on the lower mount component, causing the top securing surfaces 184a and 184b of the lower mount component to be forcibly pressed against the top securing surfaces 194a and 194b of the base mount component, and securing the lower mount component onto the base mount component.

Figure 9:
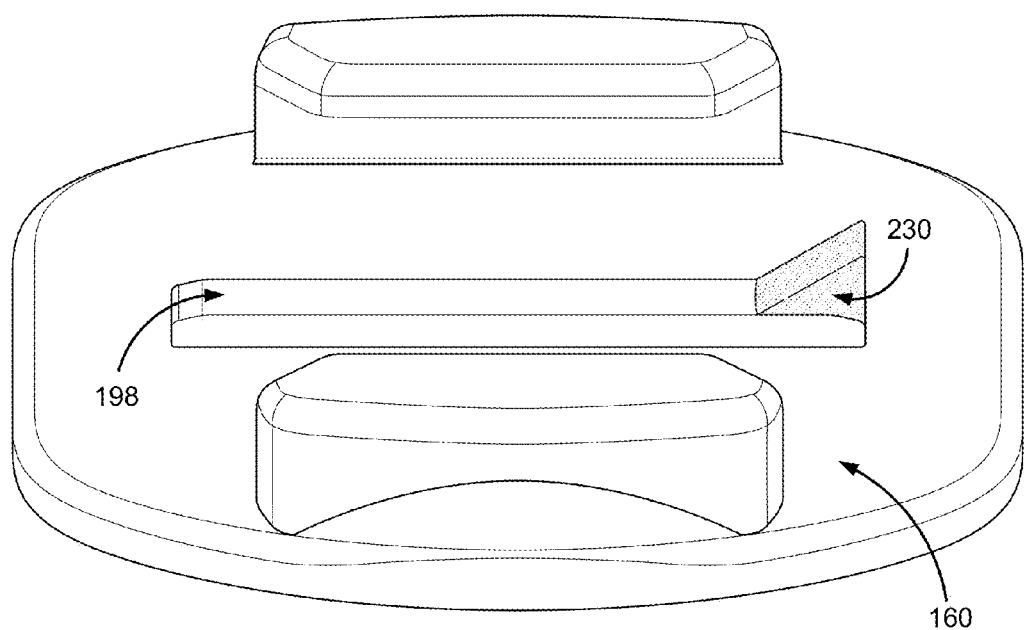
FIG. 9 illustrates a base mount component with a vibration dampening sub-component, according to one embodiment.

In some embodiments, a vibration dampening component can be fixed to the spine of the base mount component. FIG. 9 illustrates a base mount component with a vibration dampening sub-component, according to one embodiment. The vibration dampening component 230 is fixed to the spine 198 of the base mount component 160. In such an embodiment, when a lower mount component 160 is slid onto the base mount component, the lower mount component is slid into the vibration dampening component, compressing the vibration dampening component as the lower mount component is secured onto the base mount component. The compressed vibration dampening component, in response to the compression, exerts a force upward on the lower mount component, causing the top securing surfaces 184a and 184b of the lower mount component to be forcibly pressed against the top securing surfaces 194a and 194b of the base mount component, and securing the lower mount component onto the base mount component.

Additional Configuration Considerations

It is noted that some embodiments described herein have used the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a vibration dampener component as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera mount comprising:
   a lower mount component comprising a cavity and first and second compressible prongs, each compressible prong comprising a first securing surface and a securing lip;
   a base mount component comprising first and second securing arms, each securing arm comprising a second securing surface and a third securing surface, wherein the lower mount component is configured to couple to the base mount component when the first and second compressible prongs are compressed, the lower mount component is slid onto the base mount component, and the compressible prongs are decompressed such that securing lip of each prong overlaps at least in part with the third securing surface of each securing arm; and
   a vibration dampening component configured for insertion into the cavity of the lower mount component, and configured to compress when inserted into the cavity and when the lower mount component is coupled to the base mount component, the vibration dampening component configured to exert and outward force in a first direction on a bottom surface of the lower mount component and in a second direction opposite the first direction on a top surface of the base mount component such that the first securing surface of the first prong is forcibly compressed upward into the second securing surface of the first securing arm and such that the first securing surface of the second prong is forcibly compressed upward into the second securing surface of the second securing arm when the vibration dampening component is compressed, thereby restricting the movement of the lower mount component relative to the base mount component.

2. The camera mount of claim 1, wherein the base mount component further comprises a spine, and wherein the vibration dampening component, when inserted into the cavity of the lower mount component and when the lower mount component is coupled to the base mount component, is forcibly compressed into the cavity by the spine.

3. The camera mount of claim 2, wherein the spine is located on a top surface of the base mount component, wherein the cavity is located on a bottom surface of the lower mount component, and wherein the bottom surface of the lower mount component and the top surface of the base mount component overlap at least in part when the lower mount component is coupled to the base mount component.

4. The camera mount of claim 3, wherein a bottom surface of the base mount component is configured to couple to one or more of the following: a user, a helmet, a vehicle, a sports board, a piece of sporting equipment, or a surface.

5. The camera mount of claim 3, wherein a top surface of the lower mount component is configured to couple to an upper mount component configured to secure a camera.

6. A vibration dampening component comprising:
a top surface;
a bottom surface;
a left surface;
a right surface; and
a plurality of securing channels;
wherein the vibration dampening component is structured for insertion into a reciprocal cavity of a lower mount component, the reciprocal cavity comprising a plurality of securing protrusions structured for insertion into the plurality of securing channels when the vibration dampening component is inserted into the reciprocal cavity, the reciprocal cavity further comprising a top cavity surface, a left cavity surface, and a right cavity surface, wherein the top surface, the right surface, and the left surface of the vibration dampening component make flush contact with the top surface, the right surface, and the left surface of the reciprocal cavity, respectively, when the vibration dampening component is inserted into the reciprocal cavity, and wherein the vibration dampening component is forcibly compressed upward into the reciprocal cavity by a base mount component when the base mount component is coupled to the lower mount component such that the vibration dampening component exerts an outward force in a first direction on a bottom surface of the lower mount component and in a second direction opposite the first direction on a top surface of the base mount component.

* * * * *